United States Patent
Andgart et al.

(10) Patent No.: US 11,071,104 B2
(45) Date of Patent: Jul. 20, 2021

(54) DMRS WITH SHORTENED SCHEDULING

(71) Applicant: Telefonaktiebolaget LM Ericsson (publ), Stockholm (SE)

(72) Inventors: Niklas Andgart, Södra Sandby (SE); Helka-Liina Määttanen, Helsinki (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 134 days.

(21) Appl. No.: 15/062,335

(22) Filed: Mar. 7, 2016

(65) Prior Publication Data
US 2016/0270072 A1 Sep. 15, 2016

Related U.S. Application Data

(60) Provisional application No. 62/130,214, filed on Mar. 9, 2015.

(51) Int. Cl.
*H04W 72/04* (2009.01)
*H04L 5/00* (2006.01)
*H04W 8/02* (2009.01)
*H04W 72/12* (2009.01)

(52) U.S. Cl.
CPC ....... *H04W 72/0446* (2013.01); *H04L 5/0007* (2013.01); *H04L 5/0044* (2013.01); *H04L 5/0048* (2013.01); *H04L 5/0051* (2013.01); *H04W 8/02* (2013.01); *H04W 72/12* (2013.01)

(58) Field of Classification Search
CPC .......................... H04W 72/0446; H04W 72/12
See application file for complete search history.

(56) References Cited

U.S. PATENT DOCUMENTS

| 8,787,245 B2 | 7/2014 | Seo et al. | |
| 2013/0064196 A1* | 3/2013 | Gao | H04W 72/04 370/329 |
| 2014/0161098 A1* | 6/2014 | Marks | H04L 5/0007 370/330 |

(Continued)

OTHER PUBLICATIONS

Andgart et al., Provisional Patent Application entitled "DMRS with Shortened Scheduling," U.S. Appl. No. 62/130,214, filed Mar. 9, 2015.

(Continued)

*Primary Examiner* — Rhonda L Murphy
(74) *Attorney, Agent, or Firm* — Baker Botts, LLP

(57) ABSTRACT

According to some embodiments, a network node is operable to separately schedule radio transmissions per sub-subframe (SSF). A method in the network node comprises mapping a first demodulation reference signal (DMRS) to first resource elements in a first SSF. The first resource elements are associated with a first set of antenna ports. The method includes mapping a second DMRS to second resource elements in a second SSF. The second resource elements are associated with the first set of one or more antenna ports and precoding of the second DMRS differs from a precoding of the first DMRS. The method further includes scheduling a radio transmission during the first SSF precoded in accordance with the first DMRS, and scheduling a radio transmission during the second SSF precoded in accordance with the second DMRS. In particular embodiments, a subframe may comprise two, four, or eight sub-subframes.

16 Claims, 7 Drawing Sheets

(56) References Cited

U.S. PATENT DOCUMENTS

2017/0290008 A1* 10/2017 Tooher .................. H04L 1/0007

OTHER PUBLICATIONS

PCT Notification of Transmittal of the Inernational Search Report and the Written Opinion of the International Searching Authority, or the Declaration, Appln. No. PCT/IB2016/061310, dated May 13, 2016.
3GPP Draft, "Study on Latency reduction techniques for LTE," RP-150310 Motivations for Study on Latency Reduction Techniques, 3rd Generation Partnership Project (3GPP), Mobile Competence Centre; XP050932081, retrieved from the Internet on Mar. 3, 2015, URL:http://www.3gpp.org/ftp/Meetings_3GPP_SYNC/RAN/Docs/.
Examiner Report Under Sections 12 & 13 of the Patents Act, 1970 and the Patents Rules, 2003; Indian Patent Office, Application No. 201717035073; Date of Dispatch/Email: Nov. 28, 2019.

* cited by examiner

DMRS WITH SHORTENED SCHEDULING

RELATED APPLICATION

This application claims benefit under 35 U.S.C. § 119(e) to U.S. Provisional Application Ser. No. 62/130,214, entitled "DMRS WITH SHORTENED SCHEDULING," filed Mar. 9, 2015, the entire content of which is incorporated herein by reference.

TECHNICAL FIELD

Particular embodiments relate generally to reference signals in wireless communications networks, and more particularly to user equipment (UE) specific reference signals, such as demodulation reference signals (DMRS), with shortened scheduling.

BACKGROUND

Packet data latency is a performance metric that wireless equipment vendors, operators, and also end-users (via speed test applications) regularly measure. Latency may be measured in all phases of a radio access network system lifetime, such as when verifying a new software release or system component, when deploying a system, and when the system is in commercial operation.

One design goal of Third Generation Partnership Project (3GPP) long term evolution (LTE) is to provide better latency than previous generations of 3GPP radio access technologies (RATs). End-users expect LTE to provide faster access to internet and lower data latencies than previous generations of mobile radio technologies.

Packet data latency is an important factor in the perceived responsiveness of a system, and it may also indirectly influence the throughput of the system. For example, HTTP/TCP is a dominant application and transport layer protocol suite used on the internet today. According to HTTP Archive, a typical size of HTTP based transactions over the internet range from a few tens of kilobytes up to one megabyte. In this size range, the TCP slow start period comprises a significant part of the packet stream's total transport period. During TCP slow start, the performance is latency limited. Thus, improved latency can improve the average throughput for this type of TCP based transaction.

Radio resource efficiency may also benefit from latency reductions. Lower packet data latency can increase the number of transmissions possible within a certain delay bound. Thus, data transmissions may use higher block error rate (BLER) targets, which makes make more radio resources available and potentially increases the capacity of the system.

A number of applications may benefit from reduced latency in terms of improved perceived quality of experience. Examples include gaming, and real-time applications like VoLTE/OTT VoIP and multi-party video conferencing. Moving forward, a number of new applications will be even more delay critical. Examples may be remote control/driving of vehicles, augmented reality applications (e.g., smart glasses), or specific machine communications requiring low latency.

Reduced data transport latency may also indirectly facilitate faster radio control plane procedures like call set-up/bearer set-up, because of the faster transport of higher layer's control signaling. LTE is a radio access technology based on radio access network control and scheduling. Thus, latency performance may impact LTE because each data transmission includes a round trip of lower layer control signaling.

LTE physical downlink shared channel (PDSCH) assignments use resource elements spread over the orthogonal frequency division multiplexed (OFDM) symbols in a 1 ms downlink subframe. One method to decrease latency is to use PDSCH assignments covering a (consecutive) subset of symbols within the subframe. Such a subset of symbols may be referred to as sub-subframe (SSF). A SSF effectively divides the 1 ms subframe into shorter subframes, or sub-subframes. To maintain backwards compatibility, and to be able to frequency multiplex legacy terminal users, the existing OFDM modulation is not changed and the sub-subframe division is performed on an OFDM symbol level. As one example, the duration of a SSF may include seven OFDM symbols, i.e. 0.5 ms, when using normal cyclic prefix.

Assigning PDSCH resources within a sub-subframe (i.e., assigning resources based on a shorter duration than a full subframe) can reduce decoding latency because the transmission ends earlier and take less time, even for roughly the same processing capability, assuming that the payload size is down scaled appropriately. This latency reduction may also reduce hybrid automatic repeat request (HARQ) round trip time (RTT) because ACKNACK feedback can be provided earlier from the downlink and UE processing perspective. If the uplink enables timely transmission of ACK/NACK feedback, and the network processing time related to retransmissions can be scaled with the same factor as the SSF with respect to the 1 ms sub-frame, then the HARQ RTT can be reduced with the same factor. For example, given a 0.5 ms SSF, the HARQ RTT is 4 ms instead of 8 ms.

FIG. 1 is a block diagram illustrating examples of sub-subframes. FIG. 1 illustrates two subframes, subframe n and subframe n+1. Each subframe comprises two SSFs. Each SSF comprises seven OFDM symbols (for a duration of 0.5 ms). Other SSF lengths are possible, and different SSFs within a subframe may have different durations in terms of number of OFDM symbols. As illustrated, legacy signals, such as PDCCH and CRS, are transmitted according to a conventional schedule. PDSCH is not mapped to such occupied resource elements.

A UE may receive one or two shorter duration PDSCH assignments within a 1 ms subframe. For example, UE2 is scheduled for two consecutive SSFs within subframe n. UE3 and UE4 are each scheduled for one SSF within subframe n.

User equipment specific reference signals, DMRS, are transmitted on antenna ports 7, 8, . . . , v+6, where v corresponds to the number of layers. The DMRS are dedicated to a single UE, they are scheduled in a resource block pair, and they are transmitted only on resource blocks with PDSCH mapped. The DMRS in a subframe refers to the whole 1 ms subframe, with the same precoding.

A particular problem is that DMRS are scheduled over 1 ms intervals. Thus, conventional DMRS do not correspond to the shorter SSF scheduling periods.

SUMMARY

To facilitate shorter scheduling times, the embodiments described herein include reference signals that correspond to the shorter sub-subframe (SSF) scheduling periods. Particular embodiments map existing demodulation reference signal (DMRS) resource elements to various SSF within the subframe.

According to some embodiments, a network node is operable to separately schedule radio transmissions per SSF. A method in the network node comprises mapping a first DMRS to first resource elements in a first SSF. The first resource elements are associated with a first set of antenna ports. The method includes mapping a second DMRS to second resource elements in a second SSF. The second resource elements are associated with the first set of one or more antenna ports and precoding of the second DMRS differs from a precoding of the first DMRS. The method further includes scheduling a radio transmission during the first SSF precoded in accordance with the first DMRS, and scheduling a radio transmission during the second SSF precoded in accordance with the second DMRS. In particular embodiments, a subframe may comprise two, four, or eight sub-subframes.

In particular embodiments, the method may include mapping a third DMRS to one or more third resource elements in the first SSF. The one or more third resource elements are associated with a second set of one or more antenna ports. The method may include mapping a fourth DMRS to one or more fourth resource elements in the second SSF. The one or more fourth resource elements are associated with the second set of one or more antenna ports. The method includes scheduling a third radio transmission during a third SSF precoded in accordance with the third DMRS and scheduling a fourth radio transmission during a fourth SSF precoded in accordance with the fourth DMRS. The method includes transmitting the scheduled third and fourth radio transmissions. In particular embodiments, the third SSF or the fourth SSF are scheduled to a wireless device with a low mobility.

According to some embodiments, a method in a wireless device operable to receive radio transmissions scheduled separately per SSF comprises receiving a first DMRS mapped to one or more first resource elements in a first SSF. The one or more first resource elements are associated with a first set of one or more antenna ports. The method includes receiving a radio transmission precoded in accordance with the first DMRS. A subframe comprises the first SSF and a second SSF. The second SSF comprises a DMRS mapped to one or more second resource elements in the second SSF. The one or more second resource elements are associated with the first set of one or more antenna ports. In particular embodiments, a subframe may comprise two, four, or eight sub-subframes.

In particular embodiments, the received radio transmission precoded in accordance with the first DMRS is received during the first SSF. In some embodiments, the received radio transmission precoded in accordance with the first DMRS is received during a third SSF. The wireless device may comprise a wireless device with a low mobility.

According to some embodiments, a network node operable to separately schedule radio transmissions per SSF comprises a processor operable to map a first DMRS to one or more first resource elements in a first SSF. The one or more first resource elements are associated with a first set of one or more antenna ports. The processor is further operable to map a second DMRS to one or more second resource elements in a second SSF. The one or more second resource elements are associated with the first set of one or more antenna ports. A precoding of the second DMRS differs from a precoding of the first DMRS. The processor is also operable to schedule a first radio transmission during the first SSF precoded in accordance with the first DMRS and schedule a second radio transmission during the second SSF precoded in accordance with the second DMRS. The processor is operable to transmit the scheduled first and second radio transmissions.

According to some embodiments, a wireless device operable to receive radio transmissions scheduled separately per SSF comprises a processor operable to receive a first DMRS mapped to one or more first resource elements in a first SSF. The one or more first resource elements are associated with a first set of one or more antenna ports. The processor is further operable to receive a radio transmission precoded in accordance with the first DMRS. A subframe comprises the first SSF and a second SSF. The second SSF comprises a DMRS mapped to one or more second resource elements in the second SSF. The one or more second resource elements are associated with the first set of one or more antenna ports.

According to some embodiments, a network node operable to separately schedule radio transmissions per SSF comprises a mapping module, a scheduling module, and a transmitting module. The mapping module maps a first DMRS to one or more first resource elements in a first SSF. The one or more first resource elements are associated with a first set of one or more antenna ports. The mapping module maps a second DMRS to one or more second resource elements in a second SSF. The one or more second resource elements are associated with the first set of one or more antenna ports. A precoding of the second DMRS differs from a precoding of the first DMRS. A scheduling module schedules a first radio transmission during the first SSF precoded in accordance with the first DMRS and schedules a second radio transmission during the second SSF precoded in accordance with the second DMRS. The transmitting module transmits the scheduled first and second radio transmissions.

According to some embodiments, a wireless device operable to receive radio transmissions scheduled separately per SSF comprises a DMRS receiving module and a receiving module. The DMRS receiving module receives a first DMRS mapped to one or more first resource elements in a first SSF. The one or more first resource elements are associated with a first set of one or more antenna ports. The receiving module receives a radio transmission precoded in accordance with the first DMRS. A subframe comprises the first SSF and a second SSF. The second SSF comprises a DMRS mapped to one or more second resource elements in the second SSF. The one or more second resource elements are associated with the first set of one or more antenna ports.

Also disclosed is a computer program product. The computer program product comprises instructions stored on non-transient computer-readable media which, when executed by a processor, perform the acts of mapping a first DMRS to first resource elements in a first SSF. The first resource elements are associated with a first set of antenna ports. The instructions are further operable, when executed, to map a second DMRS to second resource elements in a second SSF. The second resource elements are associated with the first set of one or more antenna ports and precoding of the second DMRS differs from a precoding of the first DMRS. The instructions are further operable to schedule a radio transmission during the first SSF precoded in accordance with the first DMRS, and schedule a radio transmission during the second SSF precoded in accordance with the second DMRS.

Another computer program product comprises instructions stored on non-transient computer-readable media which, when executed by a processor, perform the acts of receiving a first DMRS mapped to one or more first resource elements in a first SSF. The one or more first resource elements are associated with a first set of one or more antenna ports. The instructions are further operable, when executed, to receive a radio transmission precoded in accordance with the first DMRS. A subframe comprises the first SSF and a second SSF. The second SSF comprises a DMRS mapped to one or more second resource elements in the second SSF. The one or more second resource elements are associated with the first set of one or more antenna ports.

Particular embodiments may exhibit some of the following technical advantages. Particular embodiments facilitate scheduling on shorter time intervals for DMRS-based transmission, while minimizing changes to the existing structure of the time-frequency grid. For example, existing DMRS resource mappings may be used to schedule SSFs. Thus, particular embodiments are backwards compatible.

In particular embodiments, dividing a subframe into two separately scheduled SSFs (e.g., each SSF corresponding to one slot) reduces both scheduling time and latency. In other embodiments, dividing a subframe into four separately scheduled SSFs (e.g., each SSF corresponding to half a slot) reduced the scheduling time, and reduces latency in two of the four SSFs. Other technical advantages will be readily apparent to one skilled in the art from the following figures, description and claims.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

Figure 1:
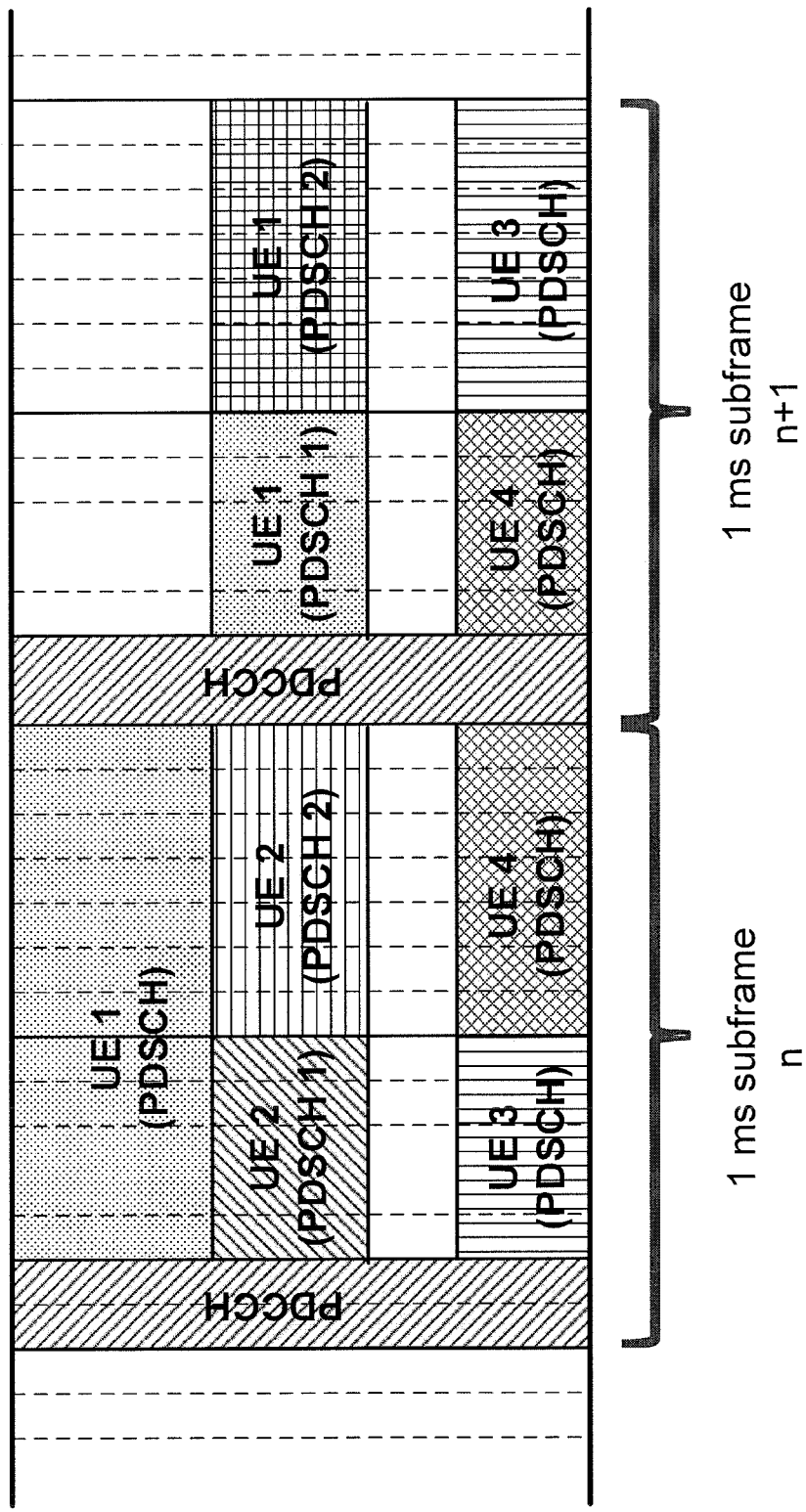
FIG. 1 is a block diagram illustrating examples of sub-subframes.

Conventional DMRS are scheduled over 1 ms intervals, which does not facilitate scheduling sub-subframes to reduce latency. An object of the present disclosure is to obviate at least these disadvantages by providing a DMRS mapping that facilitates scheduling on shorter time intervals for DMRS-based transmission, while minimizing changes to the existing structure of the time-frequency grid. For example, the current DMRS structure maps particular resource elements to antenna ports 7-10. Particular embodiments map these DMRS resources to various sub-subframes.

As a particular example, the existing DMRS pairs in slots 0 and 1 may be re-purposed for scheduling different sub-subframes of length 0.5 ms (i.e., one slot). The two SSFs may be scheduled for two different UEs, or the same UE may be scheduled to separate SSFs. As another example, the DMRS pairs within the same slot (e.g., ports 7 and 8 and ports 9 and 10) may be used to schedule different sub-subframes, one pair (e.g., 7 and 8) in the first half of the slot, and one pair (e.g., 9 and 10) in the second.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Particular embodiments are described with reference to FIGS. 1-8B of the drawings, like numerals being used for like and corresponding parts of the various drawings. LTE is used throughout this disclosure as an example cellular system, but the ideas presented herein may apply to other wireless communication systems as well.

Figure 2:
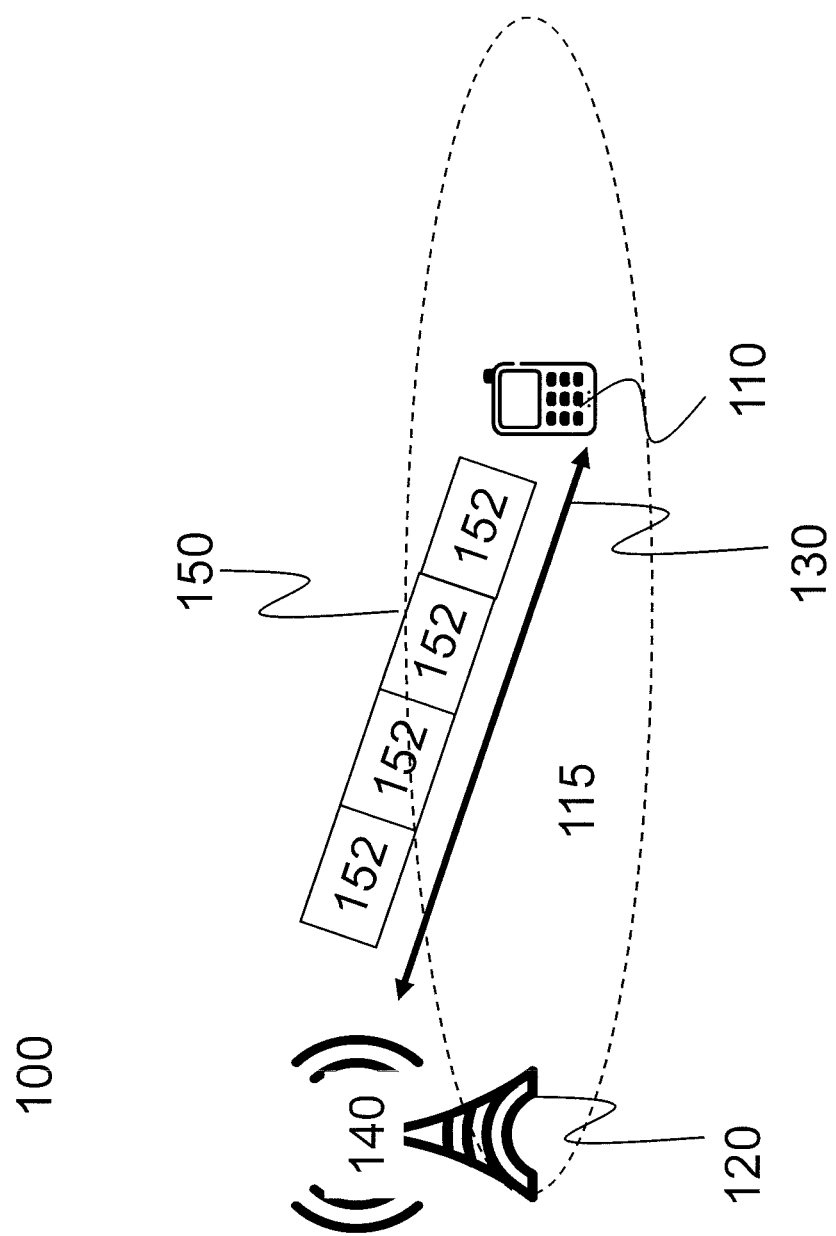
FIG. 2 is a block diagram illustrating an example wireless network, according to a particular embodiment.

FIG. 2 is a block diagram illustrating an example wireless network, according to a particular embodiment. Wireless network 100 includes one or more wireless devices 110 (such as mobile phones, smart phones, laptop computers, tablet computers, MTC devices, or any other devices that can provide wireless communication) and a plurality of network nodes 120 (such as base stations or eNodeBs). Wireless device 110 may also be referred to as a UE. Radio network node 120 serves coverage area 115 (also referred to as cell 115).

In general, wireless devices 110 that are within coverage of radio network node 120 (e.g., within cell 115 served by network node 120) communicate with radio network node 120 by transmitting and receiving wireless signals 130. For example, wireless devices 110 and radio network node 120 may communicate wireless signals 130 containing voice traffic, data traffic, and/or control signals. A network node 120 communicating voice traffic, data traffic, and/or control signals to wireless device 110 may be referred to as a serving network node 120 for the wireless device 110. Wireless signals 130 may include both downlink transmissions (from radio network node 120 to wireless devices 110) and uplink transmissions (from wireless devices 110 to radio network node 120).

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120.

Wireless signals 130 may comprise radio subframes 150. In particular embodiments, a radio subframe may comprise a number of OFDM symbols transmitted over 1 ms. Subframe 150 comprises sub-subframes 152. In particular embodiments, subframe 150 may comprise two sub-subframes 152, each of 0.5 ms duration. In other embodiments, subframe 150 may comprise four, eight, or any suitable number of sub-subframes 152. Sub-subframes 152 within subframe 150 may comprise any suitable number of OFDM symbols, and different sub-subframes 152 may comprise different numbers of OFDM symbols. A sub-subframe, or SSF, may also be referred to as a short subframe or a short transmission time interval (TTI).

Subframe 150 may include a plurality of user specific reference signals, such as DMRS. Wireless devices 110 may receive and analyze the DMRS to determine how to decode a particular subframe 150 or SSF 152.

In wireless network 100, each radio network node 120 may use any suitable radio access technology, such as long term evolution (LTE), LTE-Advanced, UMTS, HSPA, GSM, cdma2000, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 7A below. Similarly, a network node may include any suitable combination of hardware and/or software. For example, in particular embodiments, a network node, such as network node 120, may include the components described with respect to FIG. 8A below.

In particular embodiments, the network node and the wireless device use slot-based scheduling. For example, the DMRS of the first slot is mapped to the PDSCH in the first slot, and the DMRS of the second slot is mapped to the PDSCH of the second slot. The DMRS of the sub-subframes may use different precoding.

Figure 3:
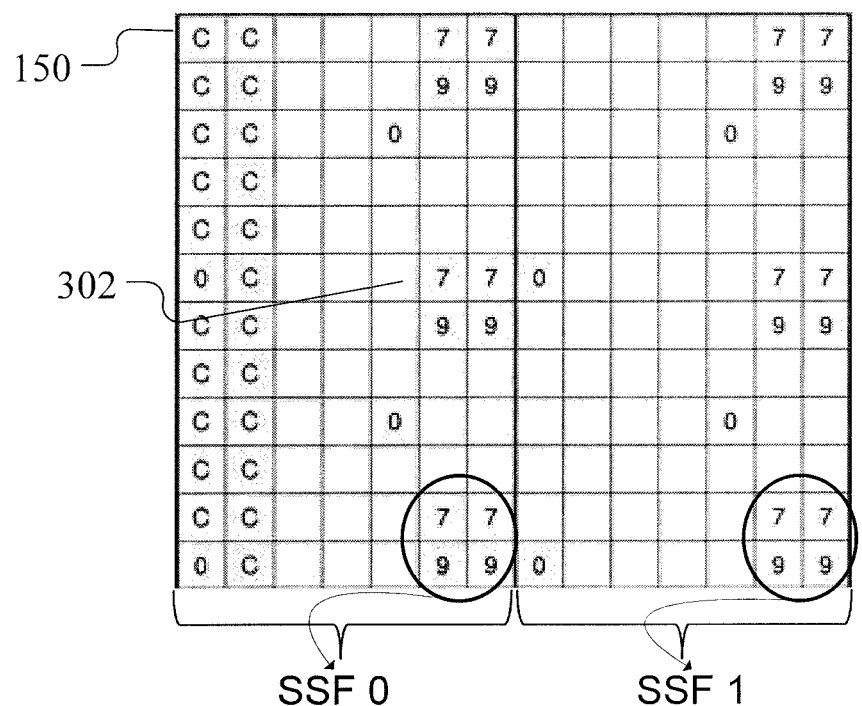
FIG. 3 is a block diagram illustrating an example subframe comprising two sub-subframes, according to a particular embodiment.

FIG. 3 is a block diagram illustrating an example subframe comprising two sub-subframes, according to a particular embodiment. The horizontal axis represents time and the vertical axis represents frequency. Subframe 150 comprises a plurality of resource elements 302. DMRS are mapped to one or more resource elements 302. Resource elements 302 marked with a "7" refer to DMRS for antenna ports 7 and 8. Resource elements 302 marked with a "9" refer to DMRS for antenna ports 9 and 10. Resource elements 302 marked with a "0" refer to cell reference signals (CRS) and those marked with a "C" refer to the control region.

Subframe 150 comprises two sub-subframes, SSF 0 and SSF 1. In this example, SSF 0 and SSF 1 each comprise two 0.5 ms slot-sized SSFs. The DMRS located in a particular slot are used for demodulation in that slot. For example, DMRS for antenna ports 7-10 in SSF 0 are used for scheduling a transmission in SSF 0. DMRS for antenna ports 7-10 in SSF 1 are used for scheduling a transmission in SSF 1. The DMRS for antenna ports 7-10 in SSF 0 may be precoded differently than the DMRS for antenna ports 7-10 in SSF 1. A particular advantage of these embodiments is that existing DMRS resource mappings may be repurposed to schedule SSF 0 and SSF 1.

In this example, SSF 0 and SSF 1 are of equal duration. In other embodiments, SSF 0 and SSF 1 may not be of equal duration or comprise an equal number of OFDM symbols. In other embodiments, subframe 150 may comprise any suitable number of SSFs 152. For example, subframe 150 may comprise four SSFs 152.

Figure 4:
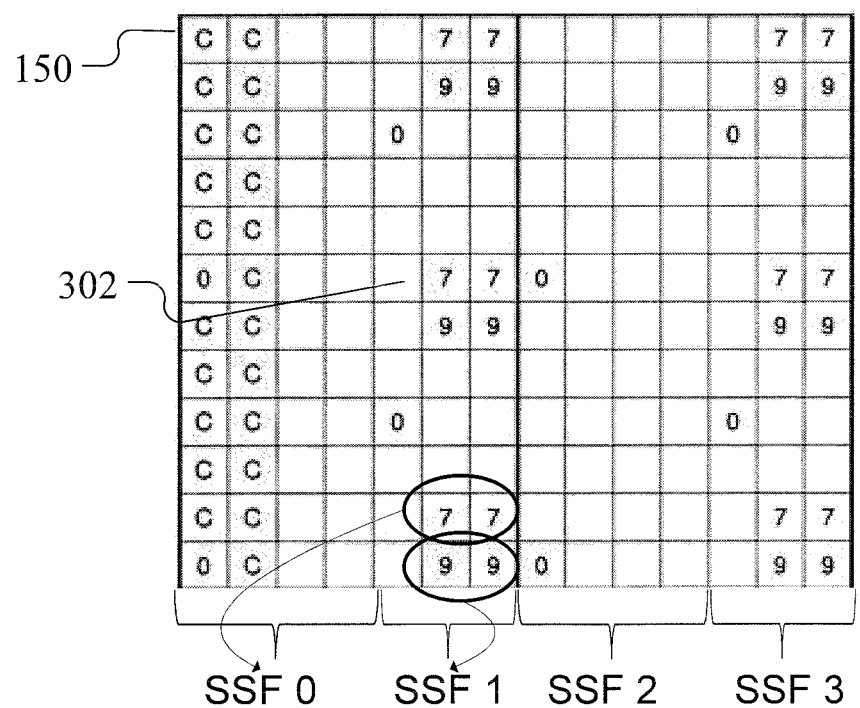
FIG. 4 is a block diagram illustrating an example subframe comprising four sub-subframes, according to a particular embodiment.

FIG. 4 is a block diagram illustrating an example subframe comprising four sub-subframes, according to a particular embodiment. The horizontal axis represents time and the vertical axis represents frequency. Subframe 150 comprises a plurality of resource elements 302. DMRS are mapped to one or more resource elements 302. Resource elements 302 marked with a "7" refer to DMRS for antenna ports 7 and 8. Resource elements 302 marked with a "9" refer to DMRS for antenna ports 9 and 10. Resource elements 302 marked with a "0" refer to cell reference signals (CRS) and those marked with a "C" refer to the control region.

Subframe 150 comprises four sub-subframes, SSF 0, SSF 1, SSF 2, and SSF 3. In this example, SSF 0 and SSF 2 each comprise four OFDM symbols, and SSF 1 and SSF 3 each comprise three OFDM symbols. Each slot comprises two SSFs. The four SSFs may be referred to as half-slot-sized SSFs. The DMRS located in a particular slot are used for demodulation in that slot. Further, DMRS for antenna ports 7 and 8 are mapped to a different half of the slot than DMRS for antenna ports 9 and 10.

For example, DMRS for antenna ports 7 and 8 in SSF 1 are used for scheduling a transmission in SSF 0. DMRS for antenna ports 9 and 10 in SSF 1 are used for scheduling a transmission in SSF 1. The second slot is mapped similarly. DMRS for antenna ports 7 and 8 in SSF 3 are used for scheduling a transmission in SSF 2. DMRS for antenna ports 9 and 10 in SSF 3 are used for scheduling a transmission in SSF 3. The DMRS for antenna ports 7-10 in SSF 1 may be precoded differently than the DMRS for antenna ports 7-10 in SSF 3. A particular advantage of these embodiments is that existing DMRS resource mappings may be repurposed to schedule SSF 0, SSF 1, SSF 2, and SSF 3.

Figure 5:
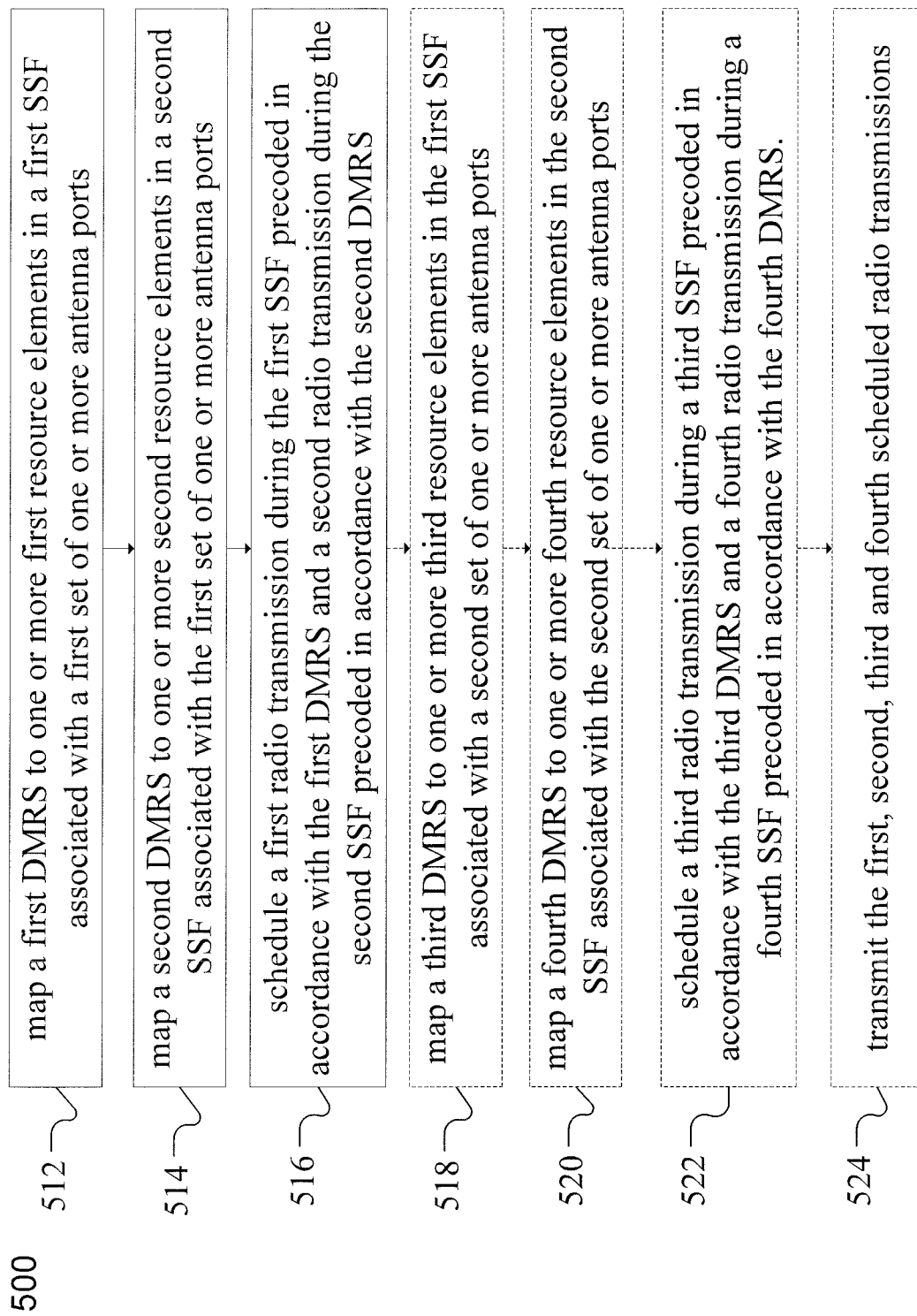
FIG. 5 is a flow diagram of a method in a network node of scheduling sub-subframes, according to particular embodiments.

As illustrated in FIG. 5, embodiments that divide a subframe into four SSFs may schedule the first and second half of a slot separately. The first half of the slot (SSF 0 and SSF 2) use ports 7 and 8, and the other half (SSF 1 and SSF 3) use port 9 and 10. In particular embodiments, this may correspond to MU-MIMO, where multiple UEs are assigned the same overlapping pilots on ports 7-10. In this example, however, the wireless device scheduled in the first half knows that is should only use ports 7 and 8 and the wireless device in the second half (which may be the same or a different UE) should use ports 9 and 10. The wireless devices know which part of the subframe includes data assigned to them, and they may ignore the rest of the subframe.

A wireless device scheduled in the first part of the slot (SSF 0 or SSF 2) receives no pilots (e.g., no DMRS) in that part of the slot. The sub-subframes in the first parts of the slots (SSF 0 and SSF 2) will exhibit longer delays than sub-subframes in the latter parts of the slots (SSF 1 and SSF 3), because the channel estimation and decoding need to wait for the reception of the DMRS in the end of the respective slots.

In particular embodiments, the network node may choose to schedule a wireless device that has a low mobility, with low Doppler spreads, in the first part of the slot, because the channel estimation for a low mobility wireless device will be more reliable than for a wireless device that is moving.

Because the SSF are of a shorter duration than the subframe, the number of pilots available may be less than the number available with 1 ms-scheduling. The lower number of pilots may limit the quality of the channel estimation. One particular method to overcome this problem is to specify that when using short sub-subframes, the wireless device is scheduled a number of consecutive resource blocks in the frequency direction with the same precoder. In this manner, the wireless device can improve the channel estimation by filtering in the frequency direction when filtering is not possible in the time direction.

When a network node schedules the same wireless device for several sub-subframes in the same subframe, the same precoder may be used, which facilitates the wireless device filtering its DMRS channel estimation in the time direction. Particular embodiments may specify that this constant precoder property applies for all sub-subframes scheduled to the same wireless device under a predefined time span of more than one 1 ms subframe.

FIGS. 3 and 4 illustrate DMRS for antenna ports 7 and 8 and antenna ports 9 and 10 each comprising two consecutive resource element pairs. In particular embodiments, the first resource element of the pair may be used to schedule a particular SSF and the second resource element of the pair may be used to schedule a different SSF. In this manner, particular embodiments may divide subframe 150 into more than four SSFs 152. For example, particular embodiments may divide subframe 150 into eight, or any suitable number of SSFs 152. Although a particular mapping of DMRS antenna ports to resource elements is illustrated, other embodiments may use any suitable mapping of DMRS antenna ports (including antenna ports in addition to ports 7-10) to resource elements.

FIG. 5 is a flow diagram of a method in a network node of scheduling sub-subframes, according to particular embodiments. In particular embodiments, one or more steps of method 500 may be performed by components of wireless network 100 described with reference to FIGS. 2-8B.

The method begins at step 512, where a network node maps a first DMRS to one or more first resource elements in a first SSF associated with a first set of one or more antenna ports. For example, network node 120 may map a first DMRS for antenna ports 7 and 8 to SSF 0 as illustrated in FIG. 3.

At step 514, the network node maps a second DMRS to one or more second resource elements in a second SSF associated with the first set of one or more antenna ports. For example, network node 120 may map a second DMRS for antenna ports 7 and 8 to SSF 1 as illustrated in FIG. 3.

At step 516, the network node schedules a first radio transmission during the first SSF precoded in accordance with the first DMRS and a second radio transmission during the second SSF precoded in accordance with the second DMRS. For example, network node 120 may schedule a first PDSCH transmission to wireless device 110 during SSF 0 precoded in accordance with the DMRS for antenna ports 7 and 8 located in SSF 0. Network node 120 may schedule a second PDSCH transmission to the same or different wireless device 110 during SSF 1 precoded in accordance with the DMRS for antenna ports 7 and 8 located in SSF 1.

At optional step 518, the network node maps a third DMRS to one or more third resource elements in the first SSF associated with a second set of one or more antenna ports. For example, in steps 512 to 516 network node 120 may have mapped a first DMRS for antenna ports 7 and 8 to SSF 1, and mapped a second DMRS for antenna ports 7 and 8 to SSF 3 as illustrated in FIG. 4. At step 518, network node 120 may map a DMRS for antenna ports 9 and 10 to SSF 0 as illustrated in FIG. 4.

At optional step 520, the network node maps a fourth DMRS to one or more fourth resource elements in the second SSF associated with the second set of one or more antenna ports. For example, network node 120 may map a DMRS for antenna ports 9 and 10 to SSF 2 as illustrated in FIG. 4.

At optional step 522, the network node schedules a third radio transmission during a third SSF precoded in accordance with the third DMRS and a fourth radio transmission during a fourth SSF precoded in accordance with the fourth DMRS. For example, at step 516 network node 120 may have scheduled a first and second PDSCH transmission to a wireless device 110 during SSF 1 and 3. At optional step 522, network node 120 may schedule a third PDSCH transmission to wireless device 110 during SSF 0 precoded in accordance with the DMRS for antenna ports 9 and 10 located in SSF 1. Network node 120 may schedule a fourth PDSCH transmission to the same or different wireless device 110 during SSF 2 precoded in accordance with the DMRS for antenna ports 9 and 10 located in SSF 3.

At step 524, the network node transmits the first, second, third, and fourth scheduled radio transmissions. For example, network node 120 transmits the SSFs scheduled in steps 512-522 to one or more wireless devices 110.

Modifications, additions, or omissions may be made to method 500. Additionally, one or more steps in method 500 of FIG. 5 may be performed in parallel or in any suitable order.

Figure 6:
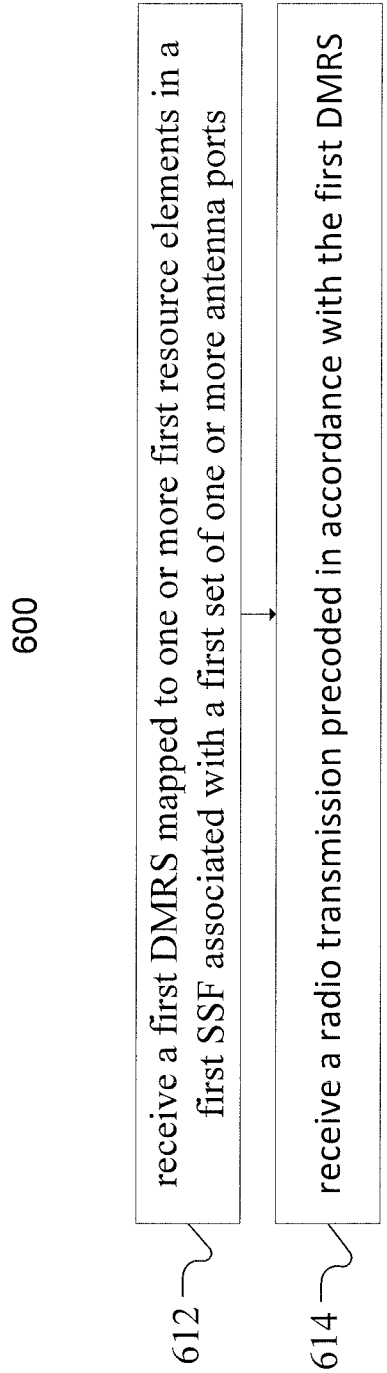
FIG. 6 is a flow diagram of a method in wireless device of receiving sub-subframes, according to particular embodiments.

FIG. 6 is a flow diagram of a method in wireless device of receiving sub-subframes, according to particular embodiments. In particular embodiments, one or more steps of method 600 may be performed by components of wireless network 100 described with reference to FIGS. 2-8B.

The method begins at step 612, where a wireless device receives a first DMRS mapped to one or more first resource elements in a first SSF associated with a first set of one or more antenna ports. For example, wireless device 110 may receive any of the DMRS in any of the SSF described with reference to FIGS. 3 and 4 above. The DMRS may have been mapped to resource elements by network node 120 as described with respect to method 500 in FIG. 5.

At step 614, the wireless device receives a radio transmission precoded in accordance with the first DMRS. For example, wireless device 110 may receive a radio transmission in an SSF, such as any of the SSFs described with reference to FIGS. 3 and 4 above. In particular embodiments the radio transmission may be precoded according to a DMRS received in the same SSF, such as SSF 0 or SSF 1 described with respect to FIG. 3. In some embodiments, the radio transmission may be precoded according to a DMRS received in a different SSF. For example, wireless device 110 may receive a data transmission in SSF 0 precoded according to the DMRS in SSF 1 described with respect to FIG. 4.

Modifications, additions, or omissions may be made to method 600. Additionally, one or more steps in method 600 of FIG. 6 may be performed in parallel or in any suitable order.

A particular advantage of the embodiments described above is that they provide backwards compatibility with previous 3GPP network equipment because conventional DMRS antenna port mappings may be reused.

Figure 7A:
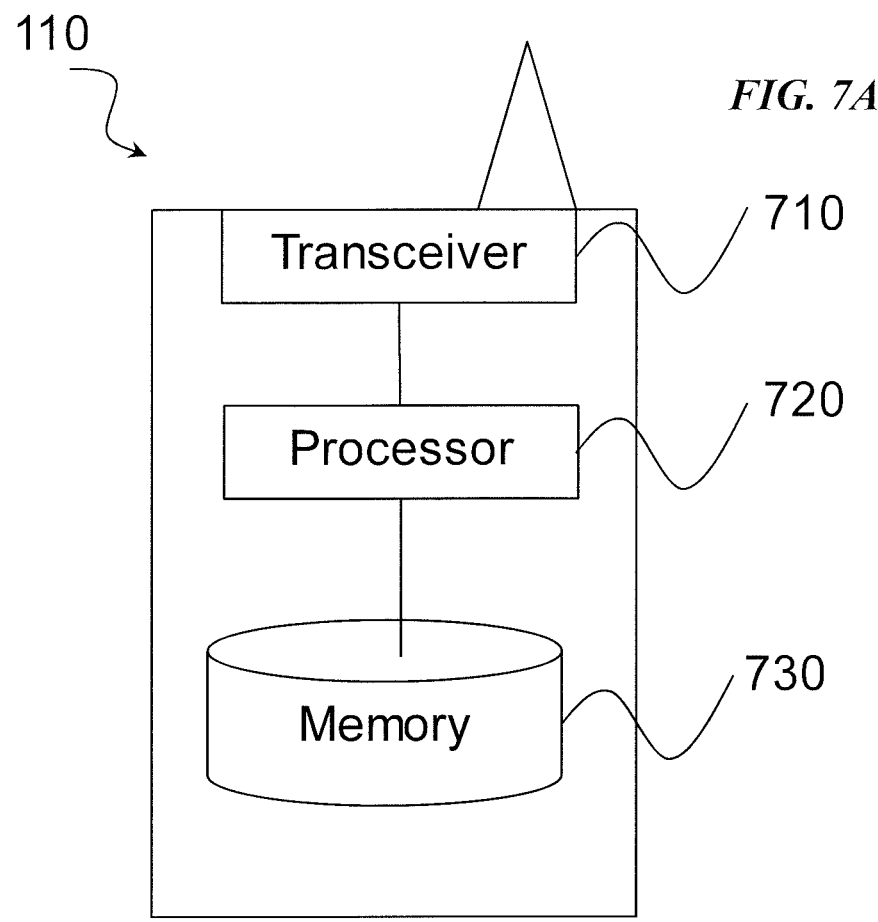
FIG. 7A is a block diagram illustrating an example embodiment of a wireless device.

FIG. 7A is a block diagram illustrating an example embodiment of a wireless device. The wireless device is an example of the wireless devices 110 illustrated in FIG. 2. The wireless device is capable of receiving data transmission scheduled using a shortened subframe of sub-subframe. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 710, processor 720, and memory 730. In some embodiments, transceiver 710 facilitates transmitting wireless signals to and receiving wireless signals from wireless network node 120 (e.g., via an antenna), processor 720 executes instructions to provide some or all of the functionality described herein as provided by the wireless device, and memory 730 stores the instructions executed by processor 720.

Processor 720 includes any suitable combination of hardware and software implemented in one or more integrated circuits or modules to execute instructions and manipulate data to perform some or all of the described functions of the wireless device. In some embodiments, processor 720 may include, for example, one or more computers, one more programmable logic devices, one or more central processing units (CPUs), one or more microprocessors, one or more applications, and/or other logic, and/or any suitable combination of the preceding. Processor 720 may include analog and/or digital circuitry configured to perform some or all of the described functions of wireless device 110. For example, processor 720 may include resistors, capacitors, inductors, transistors, diodes, and/or any other suitable circuit components.

Memory 730 is generally operable to store computer executable code and data. Examples of memory 730 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 720 in communication with transceiver 710 receives pilot and data signals from radio network node 120 or other wireless devices 110. The pilot and data signals may be received in sub-subframes. The pilot signals, such as DMRS, may be used to determine the precoding of the sub-subframes.

Other embodiments of the wireless device may include additional components (beyond those shown in FIG. 7A) responsible for providing certain aspects of the wireless device's functionality, including any of the functionality described above and/or any additional functionality (including any functionality necessary to support the solution described above).

Figure 7B:
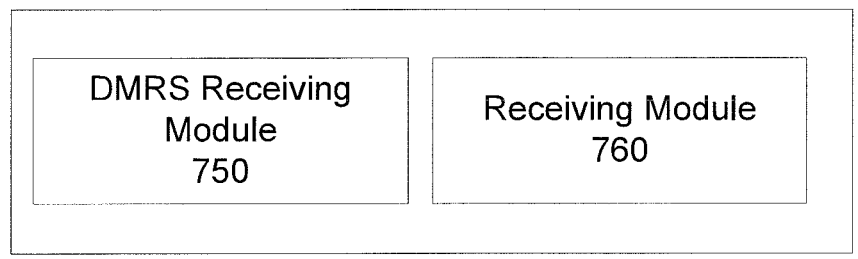
FIG. 7B is a block diagram illustrating example components of a wireless device.

FIG. 7B is a block diagram illustrating example components of a wireless device 110. The components may include DMRS receiving module 750, and receiving module 760.

DMRS receiving module 750 may perform the DMRS receiving functions of wireless device 110. For example, DMRS receiving module 750 may receive a DMRS associated with a particular sub-subframe. In certain embodiments, DMRS receiving module 750 may include or be included in processor 720. DMRS receiving module 750 may include circuitry configured to receive and analyze radio signals. In particular embodiments, DMRS receiving module 750 may communicate with receiving module 760.

Receiving module 760 may perform the receiving functions of wireless device 110. For example, receiving module 760 may receive data transmissions in sub-subframes scheduled by network node 120. In certain embodiments, receiving module 760 may include or be included in processor 720. Receiving module 760 may include circuitry configured to receive radio signals. In particular embodiments, receiving module 760 may communicate with DMRS receiving module 750.

Figure 8A:
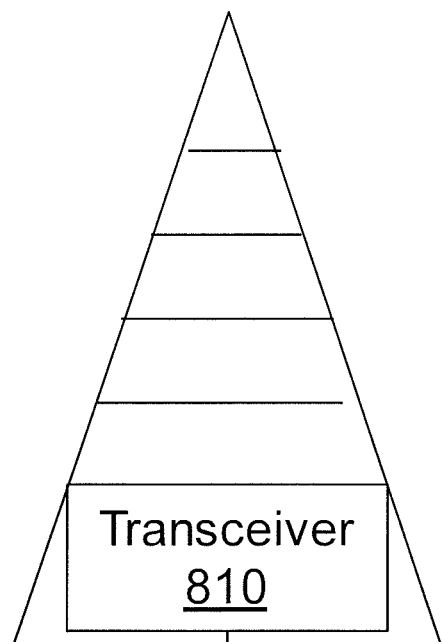
FIG. 8A is a block diagram illustrating an example embodiment of a network node.
Figure 8A:
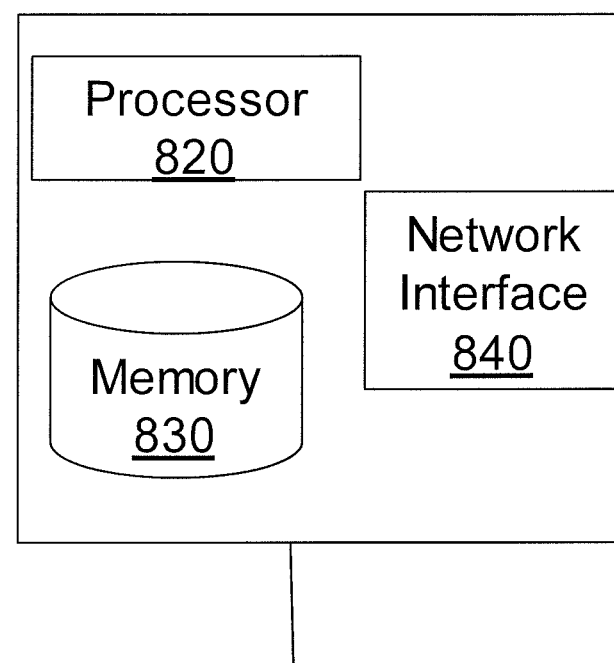

FIG. 8A is a block diagram illustrating an example embodiment of a network node. The network node is capable of data transmission using shortened subframes or sub-subframes. Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Network node 120 includes at least one transceiver 810, at least one processor 820, at least one memory 830, and at least one network interface 840. Transceiver 810 facilitates transmitting wireless signals to and receiving wireless signals from a wireless device, such as wireless devices 110 (e.g., via an antenna); processor 820 executes instructions to provide some or all of the functionality described above as being provided by a network node 120; memory 830 stores the instructions executed by processor 820; and network interface 840 communicates signals to backend network components, such as a gateway, switch, router, Internet, Public Switched Telephone Network (PSTN), controller, and/or other network nodes 120. Processor 820 and memory 830 can be of the same types as described with respect to processor 720 and memory 730 of FIG. 7A above.

In some embodiments, network interface 840 is communicatively coupled to processor 820 and refers to any suitable device operable to receive input for network node 120, send output from network node 120, perform suitable processing of the input or output or both, communicate to other devices, or any combination of the preceding. Network interface 840 includes appropriate hardware (e.g., port, modem, network interface card, etc.) and software, including protocol conversion and data processing capabilities, to communicate through a network.

In particular embodiments, processor 820 in communication with transceiver 810 map DMRS signals to sub-subframes, schedule data transmissions to wireless devices 110 during particular sub-subframes, and transmit data to wireless devices 110 according to the schedule and the mapped DMRS.

Other embodiments of network node 120 include additional components (beyond those shown in FIG. 8A) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

Figure 8B:
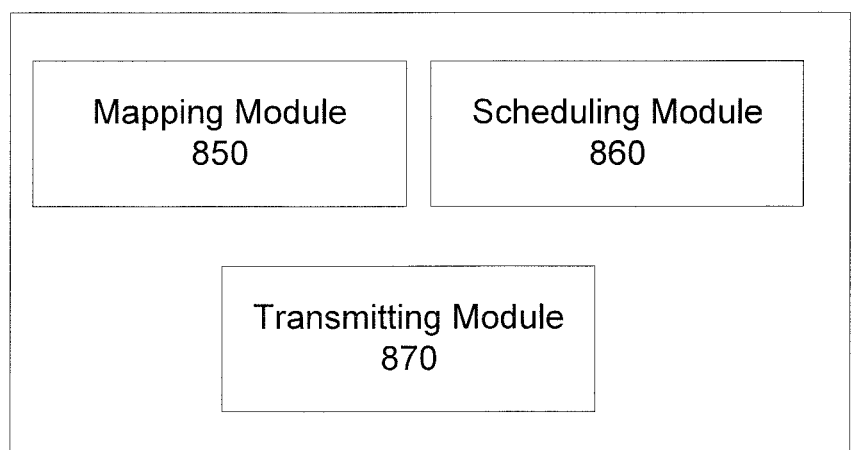
FIG. 8B is a block diagram illustrating example components of a network node.

FIG. 8B is a block diagram illustrating example components of a network node 120. The components may include mapping module 850, scheduling module 860, and transmitting module 870.

Mapping module 850 may perform the DMRS mapping functions of network node 120. For example, mapping module 850 may map DMRS signals to particular sub-subframes. In certain embodiments, mapping module 850 may include or be included in processor 820. In particular embodiments, mapping module 850 may communicate with scheduling module 860 or transmitting module 870.

Scheduling module 860 may perform the data transmission scheduling functions of network node 120. For example, scheduling module 860 may determine which wireless devices 110 receive data and on which sub-subframes. In certain embodiments, scheduling module 860 may include or be included in processor 820. In particular embodiments, scheduling module 860 may communicate with mapping module 850 or transmitting module 870.

Transmitting module 870 may perform the data transmitting functions of network node 120. For example, transmitting module 870 may transmit radio signals based on the scheduling information determined by scheduling module 860. In certain embodiments, transmitting module 870 may include or be included in processor 820. Transmitting module 870 may include circuitry configured transmit radio signals. In particular embodiments, transmitting module 870 may communicate with mapping module 850 or scheduling module 860.

Some embodiments of the disclosure may provide one or more technical advantages. As an example, some embodiments provide a DMRS mapping that facilitates scheduling on shorter time intervals for DMRS-based transmission, while minimizing changes to the existing structure of the time-frequency grid. Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BLER Block Error Rate
BTS Base Transceiver Station
CRS Cell-specific Reference Signal
DMRS Demodulation Reference Signal
eNB eNodeB
HARQ Hybrid Automatic Repeat Request
LTE Long Term Evolution
M2M Machine to Machine
OFDM Orthogonal Frequency Division Multiplexed
OTT VoIP Over-The-Top VoIP
PDSCH Physical Downlink Shared Channel
RAN Radio Access Network
RAT Radio Access Technology
RRH Remote Radio Head
RRU Remote Radio Unit
RTT Round Trip Time
SSF Sub-Subframe
TTI Transmission Time Interval
UE User Equipment
VoIP Voice over IP
VoLTE Voice over LTE
WAN Wireless Access Network

The invention claimed is:

1. A method in a wireless device of a wireless communication network, the wireless device operable to receive radio transmissions scheduled and transmitted separately per sub-subframe (SSF), the method comprising:
receiving, at a first time interval, a first SSF precoded in accordance with a first demodulation reference signal (DMRS);
receiving, at a second time interval after the first time interval, a second SSF comprising the first DMRS mapped to one or more first resource elements in the second SSF, the one or more first resource elements associated with a first set of one or more antenna ports, the one or more first resource elements corresponding to long term evolution (LTE) DMRS resources in a first slot of a subframe; and
wherein a SSF comprises a time duration shorter than a LTE subframe.

2. The method of claim 1, wherein the first and second SSF comprise a first slot of an LTE subframe.

3. The method of claim 1, wherein the first and second SSF comprise a second slot of an LTE subframe.

4. The method of claim 1, wherein the first SSF and the second SSF comprise two SSFs of a subframe comprising four SSFs.

5. The method of claim 1, wherein the wireless device comprises a wireless device with a low mobility.

6. A wireless device operable to receive radio transmissions scheduled and transmitted separately per sub-subframe (SSF), the wireless device comprising a processor operable to:
receive, at a first time interval, a first SSF precoded in accordance with a first demodulation reference signal (DMRS);
receive, at a second time interval after the first time interval, a second SSF comprising the first DMRS mapped to one or more first resource elements in the second SSF, the one or more first resource elements associated with a first set of one or more antenna ports, the one or more first resource elements corresponding to long term evolution (LTE) DMRS resources in a first slot of a subframe; and wherein a SSF comprises a time duration shorter than a LTE-subframe.

7. The wireless device of claim 6, wherein the first and second SSF comprise a first slot of an LTE subframe.

8. The wireless device of claim 6, wherein the first and second SSF comprise a second slot of an LTE subframe.

9. The method of claim 6, wherein the first SSF and the second SSF comprise two SSFs of a subframe comprising four SSFs.

10. The wireless device of claim 6, wherein the wireless device comprises a wireless device with a low mobility.

11. A method in a network node of a wireless communication network, the network node operable to separately schedule and transmit radio transmissions per sub-subframe (SSF), wherein a long term evolution (LTE) subframe comprises a first SSF, a second SSF, a third SSF, and a fourth SSF, the method comprising:

mapping a first demodulation reference signal (DMRS) to one or more first resource elements in the second SSF, the one or more first resource elements associated with a first set of one or more antenna ports, the one or more first resource elements corresponding to first LTE DMRS resources in a first slot of a subframe;

mapping a second DMRS to one or more second resource elements in the second SSF, the one or more second resource elements associated with a second set of one or more antenna ports, the one or more second resource elements corresponding to second LTE DMRS resources in the first slot of the subframe;

mapping a third DMRS to one or more third resource elements in the fourth SSF, the one or more third resource elements associated with the first set of one or more antenna ports, the one or more third resource elements corresponding to first LTE DMRS resources in a second slot of the subframe;

mapping a fourth DMRS to one or more fourth resource elements in the fourth SSF, the one or more fourth resource elements associated with the second set of one or more antenna ports, the one or more fourth resource elements corresponding to second LTE DMRS resources in a second slot of the subframe;

scheduling a first radio transmission during the first SSF precoded in accordance with the first DMRS;

scheduling a second radio transmission during the second SSF precoded in accordance with the second DMRS;

scheduling a third radio transmission during the third SSF precoded in accordance with the first DMRS;

scheduling a fourth radio transmission during the second SSF precoded in accordance with the second DMRS; and transmitting the scheduled first radio transmission at a first time interval, transmitting the second radio transmission at a second time interval after the first time interval, transmitting the third radio transmission at a third time interval after the second time interval, and transmitting the fourth radio transmission at a fourth time interval after the third time interval.

12. The method of claim 11, wherein a precoding of the first LTE DMRS differs from at least one of a precoding of the second LTE DMRS, third LTE DMRS, and fourth LTE DMRS.

13. The method of claim 11, wherein scheduling the radio transmission during the first SSF or scheduling the radio transmission during the third SSF comprises scheduling the radio transmission to a wireless device with a low mobility.

14. A network node operable to separately schedule and transmit radio transmissions per sub-subframe (SSF), wherein a long term evolution (LTE) subframe comprises a first SSF, a second SSF, a third SSF, and a fourth SSF, the network node comprising a processor operable to:

map a first demodulation reference signal (DMRS) to one or more first resource elements in the second SSF, the one or more first resource elements associated with a first set of one or more antenna ports, the one or more first resource elements corresponding to first LTE DMRS resources in a first slot of a subframe;

map a second DMRS to one or more second resource elements in the second SSF, the one or more second resource elements associated with a second set of one or more antenna ports, the one or more second resource elements corresponding to second LTE DMRS resources in the first slot of the subframe;

map a third DMRS to one or more third resource elements in the fourth SSF, the one or more third resource elements associated with the first set of one or more antenna ports, the one or more third resource elements corresponding to first LTE DMRS resources in a second slot of the subframe;

map a fourth DMRS to one or more fourth resource elements in the fourth SSF, the one or more fourth resource elements associated with the second set of one or more antenna ports, the one or more fourth resource elements corresponding to second LTE DMRS resources in a second slot of the subframe;

schedule a first radio transmission during the first SSF precoded in accordance with the first DMRS;

schedule a second radio transmission during the second SSF precoded in accordance with the second DMRS;

schedule a third radio transmission during the third SSF precoded in accordance with the first DMRS;

schedule a fourth radio transmission during the second SSF precoded in accordance with the second DMRS; and transmit the scheduled first radio transmission at a first time interval, transmit the second radio transmission at a second time interval after the first time interval, transmit the third radio transmission at a third time interval after the second time interval, and transmit the fourth radio transmission at a fourth time interval after the third time interval.

15. The network node of claim 14, wherein a precoding of the first LTE DMRS differs from at least one of a precoding of the second LTE DMRS, third LTE DMRS, and fourth LTE DMRS.

16. The network node of claim 14, wherein the processor is operable to schedule the radio transmission during the first SSF or the radio transmission during the third SSF to a wireless device with a low mobility.

* * * * *